(12) United States Patent
Venter

(10) Patent No.: US 10,428,741 B2
(45) Date of Patent: Oct. 1, 2019

(54) GAS TURBINE ENGINE WITH A GEARED TURBOFAN ARRANGEMENT

(71) Applicant: Rolls-Royce Deutschland Ltd & Co KG, Blankenfelde-Mahlow (DE)

(72) Inventor: Gideon Venter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 83 days.

(21) Appl. No.: 15/646,775

(22) Filed: Jul. 11, 2017

(65) Prior Publication Data

US 2018/0080386 A1 Mar. 22, 2018

(30) Foreign Application Priority Data

Sep. 20, 2016 (EP) .................................. 16 189 712

(51) Int. Cl.
*F02C 7/36* (2006.01)
*F02C 7/06* (2006.01)
*F02C 3/04* (2006.01)
*F16D 1/10* (2006.01)
(Continued)

(52) U.S. Cl.
CPC .................. *F02C 7/36* (2013.01); *F02C 3/04* (2013.01); *F02C 7/06* (2013.01); *F02K 3/06* (2013.01); *F16D 1/10* (2013.01); *F05D 2220/323* (2013.01); *F05D 2240/60* (2013.01); *F05D 2250/25* (2013.01); *F05D 2260/311* (2013.01); *F05D 2260/40311* (2013.01); *F16D 2001/103* (2013.01); *F16H 1/28* (2013.01)

(58) Field of Classification Search
CPC ...... F02C 7/36; F02C 7/06; F02C 3/04; F02K 3/06; F05D 2260/311; F05D 2260/40311; F05D 2240/60; F05D 2250/25; F05D 2220/323; F16H 1/28; F16D 1/10; F16D 2001/103
See application file for complete search history.

(56) References Cited

U.S. PATENT DOCUMENTS 3,997,042 A 12/1976 Langham
4,270,408 A 6/1981 Wagner
(Continued)

FOREIGN PATENT DOCUMENTS

DE 102011084360 A1 4/2013
EP 2199568 A2 6/2010
(Continued)

OTHER PUBLICATIONS

European Search Report dated Mar. 24, 2017 for counterpart European Application No. 16189712.9.
(Continued)

*Primary Examiner* — Grant Moubry
(74) *Attorney, Agent, or Firm* — Shuttleworth & Ingersoll, PLC; Timothy J. Klima

(57) ABSTRACT

A gas turbine engine, in particular an aircraft engine with a geared turbofan arrangement, with a planetary gearbox being connected through a shaft system with a propulsive fan. The shaft system includes a helical spline coupling coupling two parts of the shaft system, wherein the helical spline coupling is connecting a fan shaft and the planetary gearbox with a axially flexible but torsional stiff flexible element.

17 Claims, 6 Drawing Sheets

(51) Int. Cl.
*F02K 3/06* (2006.01)
*F16H 1/28* (2006.01)

(56) References Cited

U.S. PATENT DOCUMENTS

| | | | | |
|---|---|---|---|---|
| 5,533,825 A * | 7/1996 | Stone | ............... | F01D 5/026 403/359.6 |
| 7,716,914 B2 * | 5/2010 | Schilling | ............... | F02C 3/067 60/268 |
| 7,882,693 B2 * | 2/2011 | Schilling | ............... | F02C 3/107 60/204 |
| 9,353,690 B2 * | 5/2016 | Makulec | ............... | F01D 5/026 |
| 2002/0069637 A1 | 6/2002 | Becquerelle et al. | | |
| 2005/0220384 A1 | 10/2005 | Plona | | |
| 2008/0098717 A1 | 5/2008 | Orlando et al. | | |
| 2008/0120839 A1 | 5/2008 | Schilling | | |
| 2014/0271135 A1 | 9/2014 | Sheridan et al. | | |
| 2016/0130975 A1 | 5/2016 | Chilton et al. | | |
| 2016/0160875 A1 * | 6/2016 | Schwarz | ............... | F01D 11/22 415/124.1 |
| 2017/0081973 A1 | 3/2017 | Swift et al. | | |
| 2017/0082065 A1 | 3/2017 | Swift et al. | | |
| 2017/0175753 A1 | 6/2017 | Tan-Kim et al. | | |

FOREIGN PATENT DOCUMENTS

| | | |
|---|---|---|
| EP | 2415991 A2 | 2/2012 |
| EP | 2535528 A2 | 12/2012 |
| EP | 2360391 B1 | 4/2014 |
| EP | 2884056 A1 | 6/2015 |
| EP | 2998557 A1 | 3/2016 |
| EP | 3121469 A1 | 1/2017 |
| FR | 3022890 A1 | 1/2016 |
| GB | 2487551 A | 8/2012 |

OTHER PUBLICATIONS

European Search Report dated Mar. 30, 2017 for related European Application No. 16189699.8.
European Search Report dated Mar. 16, 2017 for related European Application No. 16189708.7.
European Search Report dated Mar. 23, 2017 for related European Application No. 16189697.2.
Dominic Boniface—U.S. Appl. No. 15/647,953, filed Jul. 12, 2017.
Dominic Boniface—U.S. Appl. No. 15/708,716, filed Sep. 19, 2017.
Dominic Boniface—U.S. Appl. No. 15/707,471, filed Sep. 18, 2017.

* cited by examiner

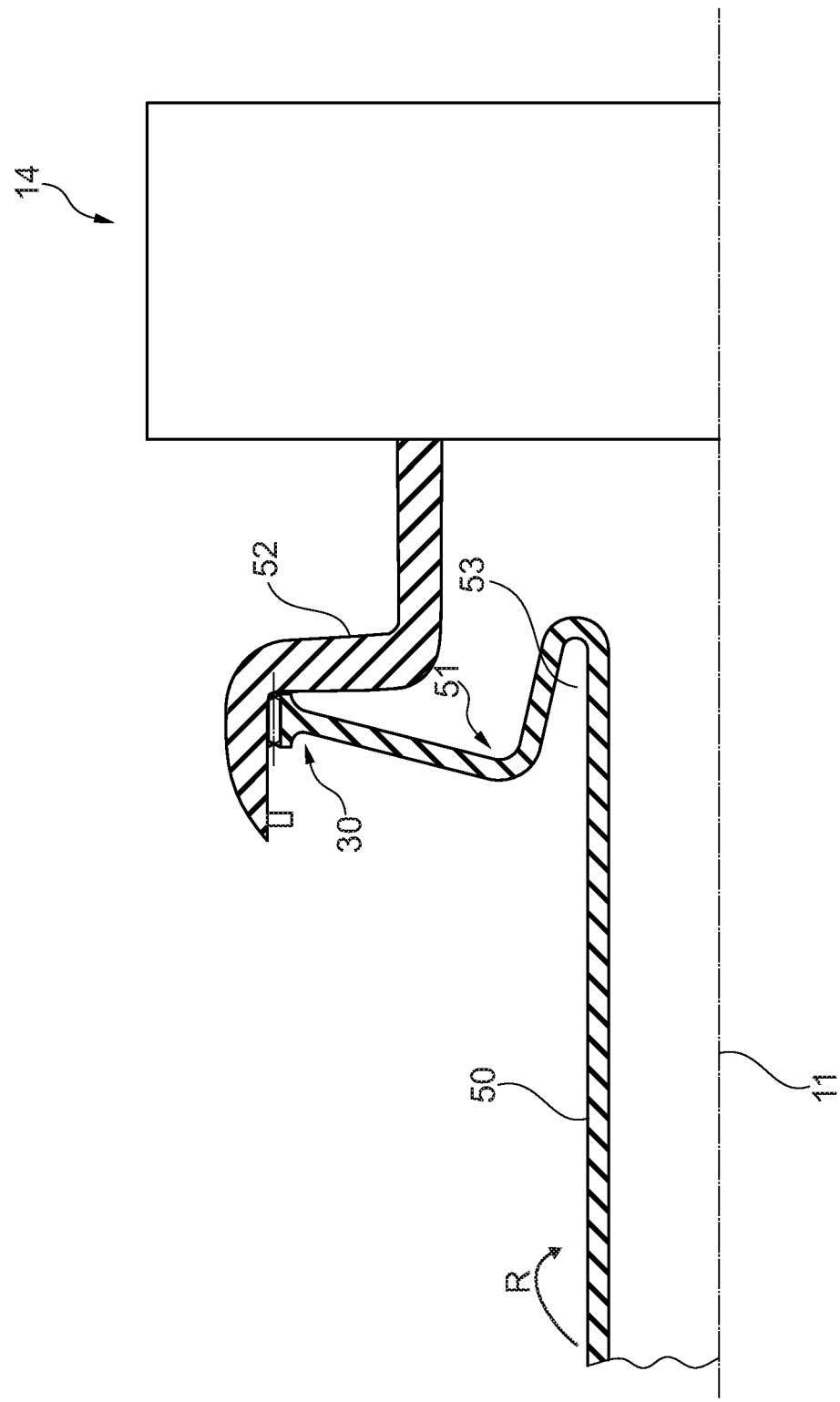

GAS TURBINE ENGINE WITH A GEARED TURBOFAN ARRANGEMENT

REFERENCE TO RELATED APPLICATION

This application claims priority to European Patent Application No. 16 189 712.9 filed on Jun. 20, 2016, the entirety of which is incorporated by reference herein.

BACKGROUND

The invention relates to a gas turbine engine with a geared turbofan arrangement.

Gas turbine engines with geared turbofan arrangements, in particular aircraft engines, require some means to mitigate static and dynamic loads on the gearbox (also called power gearbox) linking a turbine section of the gas turbine engine with the propulsive fan.

The gearbox with a planetary gear arrangement reduces the rotational speed from the turbine section of the gas turbine engine to the propulsive fan, so that the efficiency of the gas turbine engine is improved. The loads on the planetary gearbox can be considerably, in particular under certain events as e.g. a planetary gearbox blocking event.

SUMMARY

Therefore gas turbine engines with improved stability are required.

This issue is addressed by a gas turbine engine with features as described herein.

The gas turbine engine, in particular an aircraft engine with a geared turbofan arrangement comprises a planetary gearbox being connected through a shaft system with the propulsive fan, wherein the shaft system comprises a helical spline coupling, coupling two parts of the shaft system. For good operational performance the helical spline coupling is attached to a fan shaft and the planetary gearbox through an axially flexible but torsionally stiff flexible element, in particular a drive flange. The helical spline coupling can engage and disengage the two parts of the shaft system depending on the torque applied to the two parts. Under normal operating conditions the two parts are engaged. In case of an event causing a reversal of the torque under e.g. windmilling condition the two parts disengage.

In an embodiment of the gas turbine engine the form of the teeth of the helical spline coupling are parallel or involute.

In a further embodiment the helical teeth of the helical spline coupling have a helix angle $\beta$ in a range between $0°<\beta<60°$, in particular $10°<\beta<45°$. The helix angle is the angle between the helical tooth face and an equivalent spur tooth face (i.e. a straight cut gear with teeth parallel to the rotation axis). The helix angle $\beta$ is understood to be measured at the standard pitch diameter.

In a further embodiment the helical teeth of the helical coupling are formed with the hub or inserted into the hub.

In one embodiment the height of the helical teeth is sized to minimize the axial spline length.

In one embodiment the flexible element is formed by a trough structure in which a section of the fan shaft bends for more than 90° against a plane perpendicular to the rotational axis. Such a folded structure is axially flexible, but torsionally stiff.

In one embodiment, the helical spline coupling is connecting a fan shaft and a torque carrier of the planetary gear.

Another embodiment comprises helical teeth of the helical coupling which are so oriented that in the drive rotation direction the axial engagement of the two parts of the shaft system is blocked.

But if the rotation direction reverses, in particular caused by a windmilling propulsive fan a torque is generatable which has the opposite direction of the torque under the drive rotation direction leading to a disengagement of the parts.

A compact embodiment comprises the first part of the shaft system as a torque carrier of the planetary gearbox and the second part of the shaft system as the flexible element or a fan shaft.

The coupling of the helical spline with the shaft system requires some form of lubrication. In one embodiment the radially outer part of the helical spline connection with the shaft system comprises at least one oil reservoir. In the rotary system a hydraulic oil reservoir can form due to centrifugal forces.

In one particular embodiment the oil reservoir comprises a circumferential oil weir for the oil reservoir at the torque carrier of the shaft system engaged with the helical spline. The torque carrier can be the outer part of the helical spline connection with the shaft system.

BRIEF DESCRIPTION OF THE DRAWINGS

Embodiments of the invention are shown in the figures.

FIG. 2 a schematic sectional view of a helical spline coupling in a shaft system under normal drive conditions.

DETAILED DESCRIPTION

Figure 1:
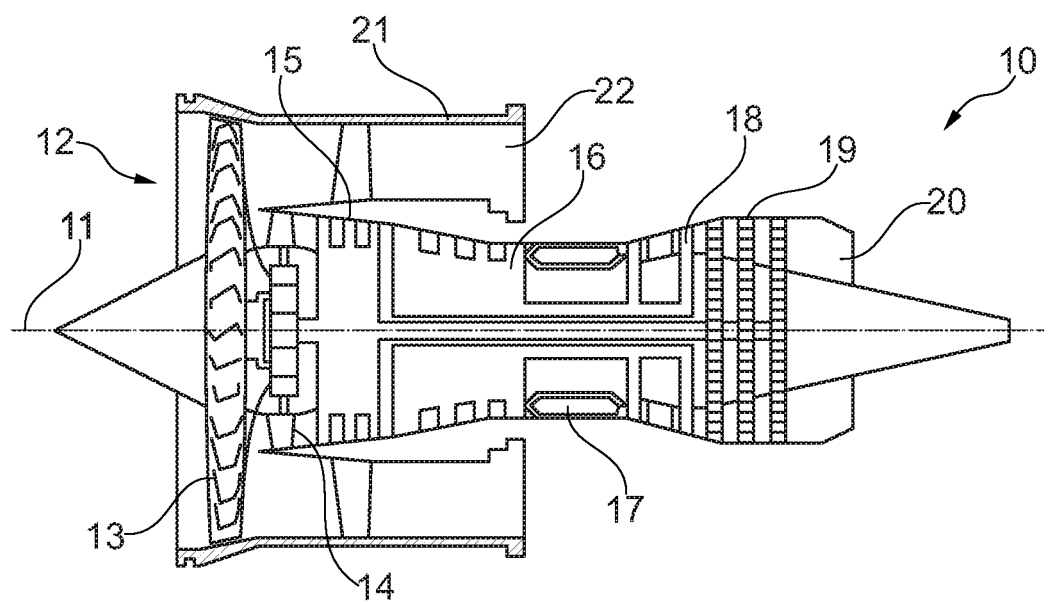
FIG. 1 shows a schematic drawing of a gas turbine engine according to the prior art.

With reference to FIG. 1, a gas turbine engine is generally indicated at 10, having a principal and rotational axis 11. The engine 10 comprises, in axial flow series, an air intake 12, a propulsive fan 13, a gearbox 14, an intermediate pressure compressor 15, a high-pressure compressor 16, combustion equipment 17, a high-pressure turbine 18, a low-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture combusted. The resultant hot combustion products then expand through, and thereby drive the high 18 and low-pressure 19 turbines before being exhausted through the nozzle 20 to provide additional propulsive thrust. The high 18 and low 19 pressure turbines drive respectively the high pressure compressor 16 and intermediate pressure compressor 15, each by suitable interconnecting shaft. The low pressure shaft 19 also drives the fan 13 via the gearbox 14. The gearbox 14 is a reduction gearbox in that it gears down the rate of rotation of the fan 13 by comparison with the intermediate pressure compressor 15 and low pressure turbine 19. The gearbox 14 is an epicyclic planetary gearbox 14 having a static ring gear, rotating and orbiting planet gears supported by a planet carrier and a rotating sun gear.

Figure 2A:
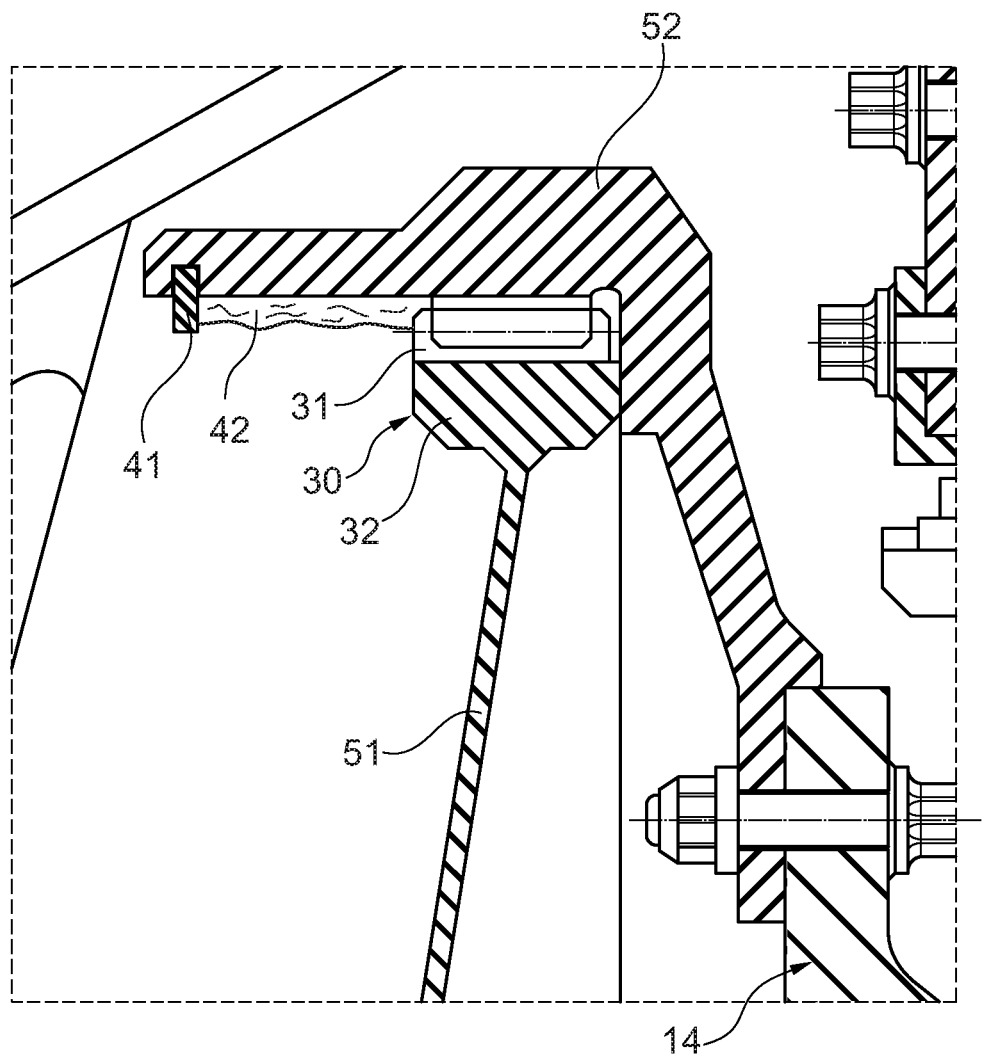
FIG. 2A a detail of a helical spline coupling in FIG. 2.
Figure 3:
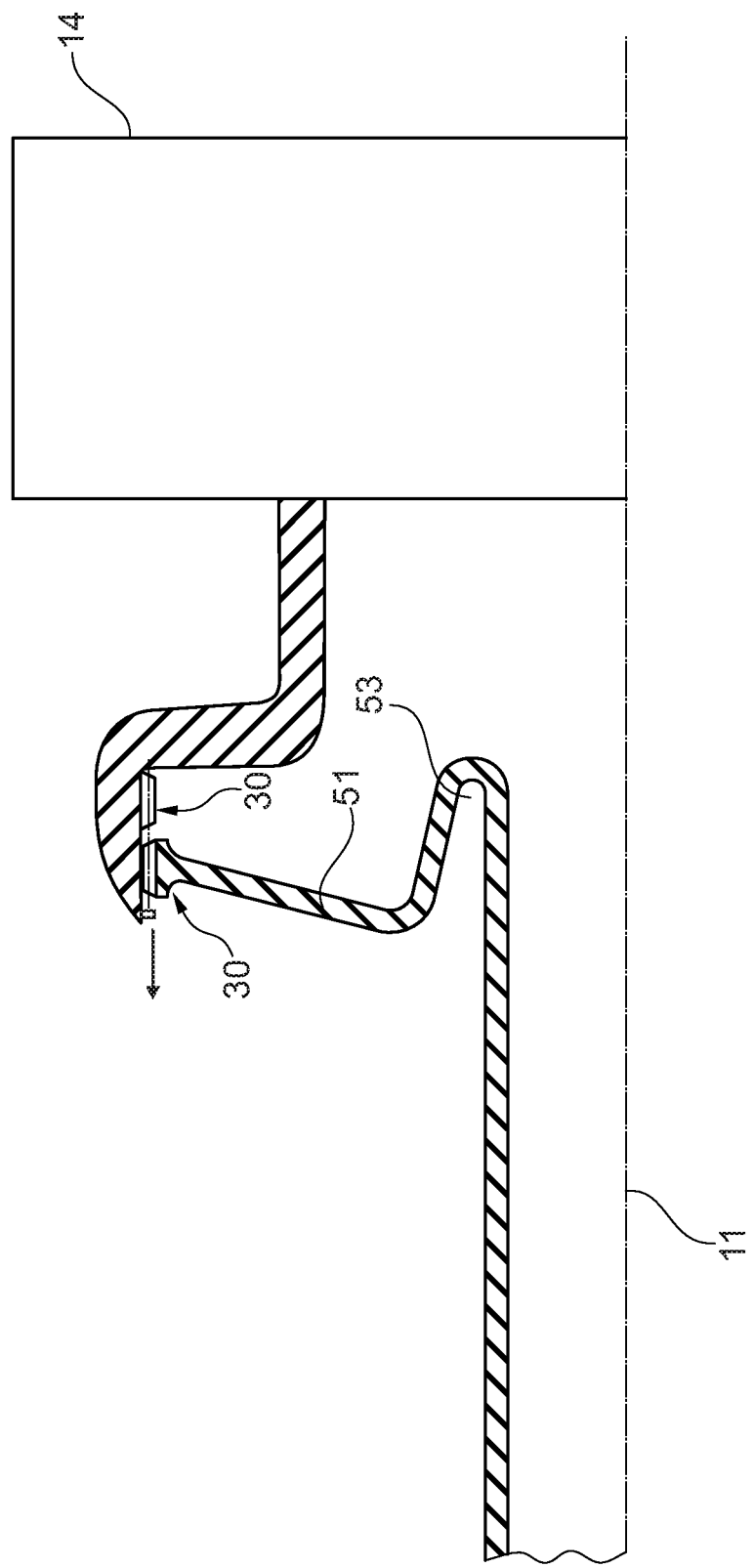
FIG. 3 a schematic sectional view of the helical spline coupling in FIG. 2 in a windmilling situation.

FIGS. 2 and 3 show sectional views of the outputs side of the gearbox 14 in different operational situations.

The propulsive fan 13 (not shown in FIGS. 2 and 3) is connected with a shaft system 50, 51, 52 to the planetary gearbox 14. A torque carrier 52 of the planetary gearbox 14 transmits torque via a helical coupling 30 (details in FIGS. 2A, 4, 5, and 6) to a flexible flange 51 via a fan shaft 50 to the propulsive fan 13. The fan shaft 50, the flexible flange 51 and the torque carrier 52 form a shaft system 50, 51, 52.

The flexible flange 51 comprises a trough section 53 in which the shaft system—as seen from the fan shaft 50—comprises bent almost 180° (but at least more than 90°) back towards the fan shaft 50. Since the fan shaft 50 and the flexible flange 51 are rotationally symmetric, a trough 53 (or a fold) is formed. This flexible flange 51 is torsional stiff and axially flexible.

The axial stiffness of the flexible flange 51 is be defined to ensure disengagement in the case of a blocked fan drive system to avoid unplanned disengagement and wear of the parts. The shape of the flexible flange 51 is be optimized to ensure the correct axial stiffness, torque transfer capability and minimum weight.

In other embodiments the shaft system 50, 51, 52 can have a different shapes or sections. In any case two parts of the shaft system 51, 52 are coupled with a helical spline 30.

At the radial outer rim of the flexible flange 51, a helical spline 30 is positioned which meshes with the torque carrier 52 of the planetary gearbox 14 (see FIG. 2A).

The torque carrier 52 can act as an axial constraint for the helical spline 30, since it abuts the helical spline on one side (e.g. in FIG. 2A on the right hand side of the torque carrier 52).

The inner side of the distal end of the torque carrier 52 comprises an oil reservoir 42 under centrifugal forces during the operation of the gas turbine engine 10. The oil reservoir 42 can form between the angle-shaped torque carrier 52 (see e.g. FIG. 2A) and an oil weir 41 which is positioned circumferentially at the inner side of the distal end of the torque carrier 52. The oil weir 41 is built as ring partially set into the torque carrier 52.

The functionality of the helical spline 30 is described in the context of FIGS. 2 to 6.

Both FIGS. 2 and 2A show the helical spline coupling in an engaged position. This is the position during normal operation with the drive rotation R.

When under a rotation in the drive rotation R under normal condition the spline helix angle β of the helical spline coupling 30 will ensure that the splines will engage (see FIGS. 2 and 4) through inward oriented axial forces $F_{axial}$. Therefore, in the drive direction the axial engagement E of the splines are constrained.

But in a reverse rotation direction which would occur, when e.g. the planetary gearbox 14 or the propulsive fan 13 is blocked, the aerodynamic drag of the propulsive fan 13 will generate a torque in the opposite direction to the normal operational torque direction R, i.e. opposite to the drive rotation R. Hence, this windmilling torque will axially disengage the helical spline coupling 30 (see FIGS. 3 and 5) due to the axial force $F_{axial}$ that is developed by helix angle β of the helical teeth 31 of the helical coupling (see FIG. 6).

The axial stiffness of the shaft system, in particular of the flexible drive flange 51 will not result in disengagement of the helical spline coupling 30 by the windmilling torque required to rotate a free rotating planetary gearbox 14 and fan drive system.

Generally, helical spline couplings 30 comprise equally spaced grooves to form a helical teeth 31 about the shaft. The sides of those helical teeth 31 can be parallel or involute. Such a configuration can either minimize stress concentrations for a stationary joint under high load, or allow for rotary and linear motion between the parts.

One advantage of a helical spline is, that the male spline allows an equal "wind" along the entire length of the spline, resulting in full contact along the drive side of the tooth 31. This load sharing distributes the rotational torque along a greater length of the shaft, which now includes the spline.

When sudden rotation of an axially fixed member of the spline coupling is introduced, the helical teeth 31 of the splines slide against each other. This thrusts the axially floating detail forward, or backward, depending upon rotational direction. This type of spline can be used for engagement or disengagement of face couplings through the use of rotary motion as is shown in FIG. 2 (engaged) and FIG. 3 (disengaged).

In FIG. 2 it is shown that the helical spline coupling is meshed as shown also in FIG. 2A in an engaged position.

In FIG. 3 e.g. the windmilling causes a movement of the helical spline coupling 30 attached to the flexible drive flange 51 in a forward direction as indicated by an arrow.

Figure 4:
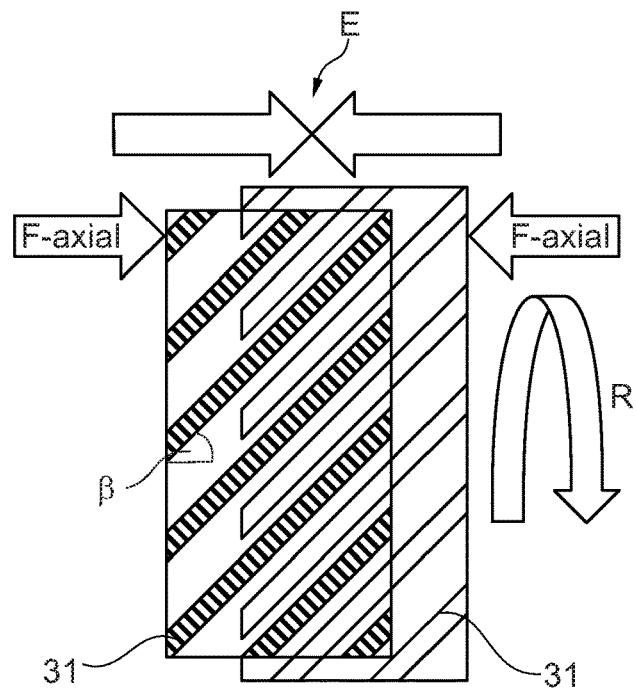
FIG. 4 a schematic view of the helical splines under normal drive conditions.
Figure 5:
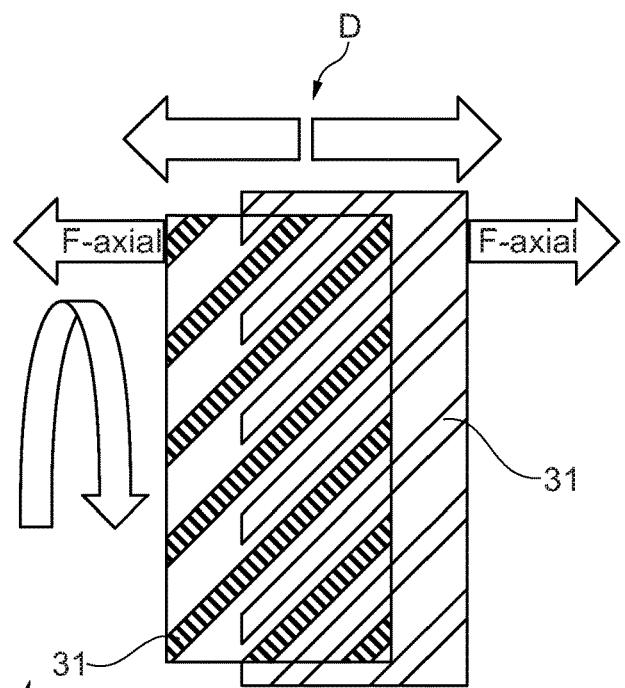
FIG. 5 a schematic view of the helical splines under windmilling conditions.

In FIG. 4 the engagement of the helical spline coupling 30 is shown in a schematic way. The rotation R on the helical spline coupling 30 cause axial forces F-axial which result in an engagement E of the helical spline coupling 30 with the In FIG. 5 the disengagement D of the helical coupling 30 is shown in a similar way. Here the rotation R under windmilling the gives rise to forces F-axial which cause the disengagement D of the helical spline coupling 30.

Figure 6:
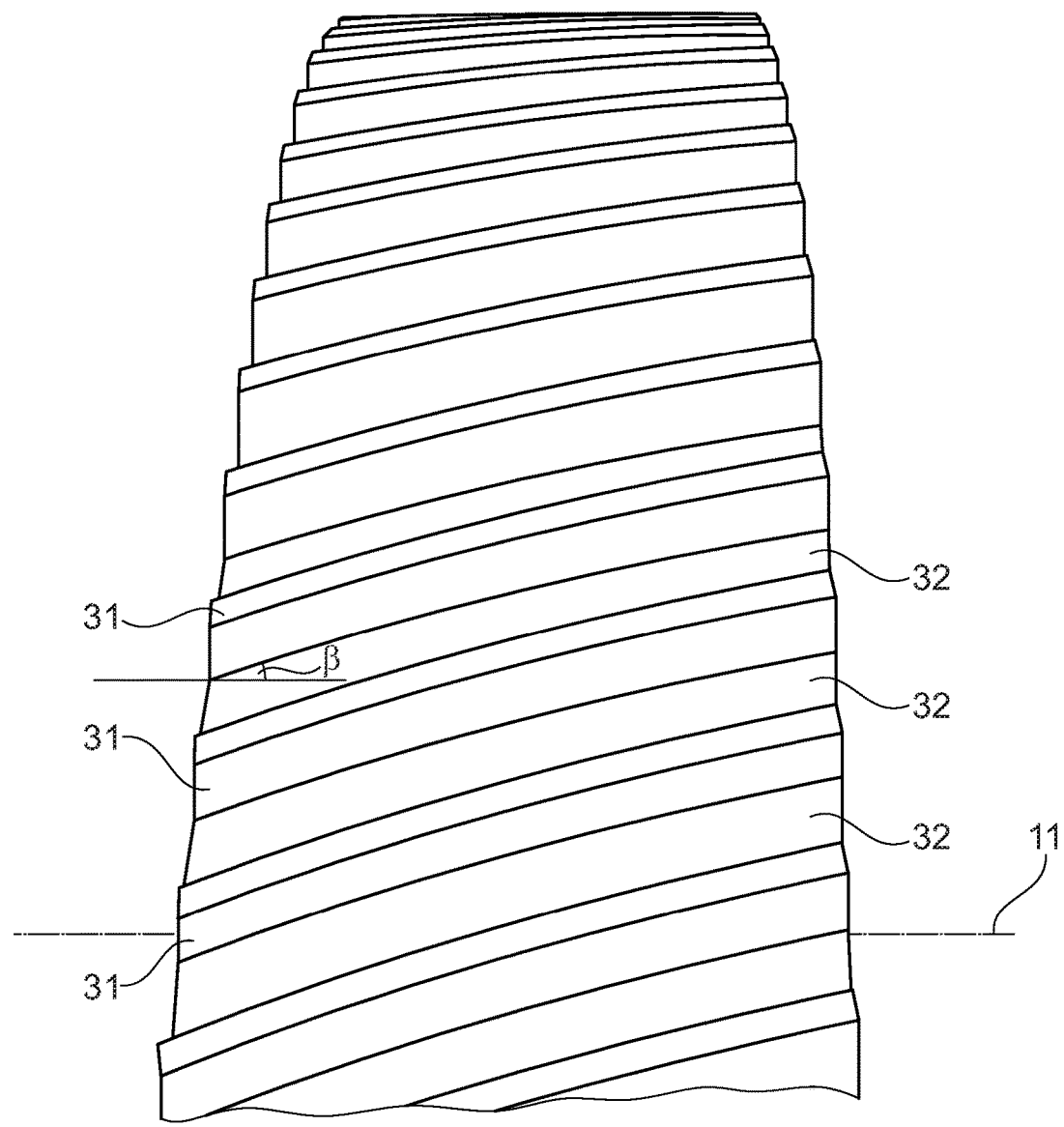
FIG. 6 a schematic view of the helical teeth of a helical spline coupling.

FIG. 6 shows schematically the helical teeth 31 of a part of a helical spline. The helical teeth 31 are formed integral with the hub 32. In alternative embodiments the teeth 31 could be separate parts embedded in the hub 32.

LIST OF REFERENCE NUMBERS 10 gas turbine engine
11 principal rotational axis
12 air intake
13 propulsive fan
14 planetary gearbox, power gearbox
15 intermediate pressure compressor
16 high-pressure compressor
17 combustion equipment
18 high-pressure turbine
19 low-pressure turbine
20 exhaust nozzle
21 fan casing
22 by-pass duct
30 helical spline
31 helical tooth of helical spline
32 hub of helical spline
41 oil weir
42 oil
50 fan shaft 51 drive flange
52 torque carrier of planetary gearbox
53 flexible element
β helix angle
D Disengagement
E Engagement
F-axial axial force acting on helical spline coupling

The invention claimed is:

1. An aircraft gas turbine engine comprising:
a geared turbofan arrangement, including a planetary gearbox connected through a shaft system with a propulsive fan;
wherein the shaft system comprises a helical spline coupling coupling two parts of the shaft system;
wherein the helical spline coupling connects a fan shaft and the planetary gearbox with an axially flexible but torsional stiff flexible element;
wherein the fan shaft includes a tubular wall that at a downstream end of the fan shaft curves radially outward to form a radially extending disc-shaped portion, the flexible element including the radially extending disc-shaped portion.

2. The aircraft gas turbine engine according to claim 1, wherein the helical spline coupling includes helical teeth which are parallel or involute.

3. The aircraft gas turbine engine according to claim 1, wherein the helical spline coupling includes helical teeth having a helix angle range β, where 0°<β<60°.

4. The aircraft gas turbine engine according to claim 1, wherein the helical spline coupling includes a hub and helical teeth formed with the hub or inserted into the hub.

5. The aircraft gas turbine engine according to claim 1, wherein the helical spline coupling includes helical teeth and a height of the helical teeth is sized to minimize an axial spline length.

6. The aircraft gas turbine engine according to claim 1, wherein the radially extending disc-shaped portion is a drive flange.

7. The aircraft gas turbine engine according to claim 1, wherein the flexible element includes a trough structure in which a section of the fan shaft bends for more than 90° against a plane perpendicular to a rotational axis.

8. The aircraft gas turbine engine according to claim 1, wherein the helical spline coupling connects the fan shaft and a torque carrier of the planetary gearbox.

9. The aircraft gas turbine engine according to claim 1, wherein the helical spline coupling includes helical teeth that are oriented such that in a drive rotation direction, an axial engagement of the two parts of the shaft system is blocked.

10. The aircraft gas turbine engine according to claim 1, wherein in a rotation direction reverse to a drive rotation direction caused by a windmilling propulsive fan, a torque is generatable which has an opposite direction of the torque under the drive rotation direction leading to a disengagement of the two parts.

11. The aircraft gas turbine engine according to claim 1, wherein a first part of the two parts is a torque carrier of the planetary gearbox and a second part of the two parts is the flexible element or the fan shaft.

12. The aircraft gas turbine engine according to claim 1, wherein a radially outer part of the helical spline coupling comprises at least one oil reservoir.

13. The aircraft gas turbine engine according to claim 12, wherein the oil reservoir comprises a circumferential oil weir at a torque carrier of the shaft system engaged with the helical spline coupling.

14. The aircraft gas turbine engine according to claim 1, wherein the helical spline coupling includes helical teeth having a helix angle range β, where 10°<β<45°.

15. An aircraft gas turbine engine comprising:
a geared turbofan arrangement, including a planetary gearbox connected through a shaft system with a propulsive fan;
wherein the shaft system comprises a helical spline coupling coupling two parts of the shaft system;
wherein the helical spline coupling connects a fan shaft and the planetary gearbox with an axially flexible but torsional stiff flexible element;
wherein the flexible element includes a trough structure in which a section of the fan shaft bends for more than 90° against a plane perpendicular to a rotational axis.

16. An aircraft gas turbine engine comprising:
a geared turbofan arrangement, including a planetary gearbox connected through a shaft system with a propulsive fan;
wherein the shaft system comprises a helical spline coupling coupling two parts of the shaft system;
wherein the helical spline coupling connects a fan shaft and the planetary gearbox with an axially flexible but torsional stiff flexible element;
wherein a radially outer part of the helical spline coupling comprises at least one oil reservoir.

17. The aircraft gas turbine engine according to claim 16, wherein the oil reservoir comprises a circumferential oil weir at a torque carrier of the shaft system engaged with the helical spline coupling.

* * * * *